United States Patent
Kim

(10) Patent No.: US 6,591,117 B1
(45) Date of Patent: Jul. 8, 2003

(54) MOBILE COMMUNICATION TERMINAL WITH MULTI-FUNCTION KEY

(75) Inventor: Eui-Jung Kim, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/222,380

(22) Filed: Dec. 29, 1998

(30) Foreign Application Priority Data

Dec. 29, 1997 (KR) .......................................... 97/75994

(51) Int. Cl.$^7$ ................................................. H04B 1/38
(52) U.S. Cl. ........................................ 455/566; 455/564
(58) Field of Search ............................... 455/550, 564, 455/566, 575, 90; 379/428, 433

(56) References Cited

U.S. PATENT DOCUMENTS

| | | | | |
|---|---|---|---|---|
| 5,247,565 A | * | 9/1993 | Joglekar et al. | 455/564 |
| 5,633,912 A | * | 5/1997 | Tsoi | 455/566 |
| 5,758,295 A | * | 5/1998 | Ahlberg et al. | 455/566 |
| 5,884,185 A | * | 3/1999 | Kim | 455/550 |
| 5,903,852 A | * | 5/1999 | Schaupp, Jr. et al. | 455/564 |
| 5,926,769 A | * | 7/1999 | Valimaa et al. | 455/564 |
| 5,960,357 A | * | 9/1999 | Kim | 455/90 |
| 6,026,161 A | * | 2/2000 | Larsen et al. | 379/433 |
| 6,055,439 A | * | 4/2000 | Helin et al. | 455/550 |
| 6,151,485 A | * | 11/2000 | Crisp | 455/90 |
| 6,453,179 B1 | * | 9/2002 | Larsen | 455/566 |

FOREIGN PATENT DOCUMENTS

GB          2262630          *  6/1993

* cited by examiner

*Primary Examiner*—Nay Maung
(74) *Attorney, Agent, or Firm*—Dilworth & Barrese, LLP

(57) ABSTRACT

A mobile communication terminal with a multi-function key which serves as both a store key and a recall key. The mobile communication terminal includes a multi-function key; a memory for storing, in a function allocation table, input conditions of the multi-function key and corresponding functions for the respective input conditions; and a controller for determining a function of the multi-function key based on the function allocation table, when the multi-function key is pressed according to a given input condition. Further, the mobile communication terminal includes a memory for storing messages for informing a user about the determined function, and a display for displaying a message for informing the user of the determined function. The controller includes a flag, and sets the flag according to the function determined for the multi-function key.

6 Claims, 2 Drawing Sheets

MOBILE COMMUNICATION TERMINAL WITH MULTI-FUNCTION KEY

BACKGROUND OF THE INVENTION

1. Field of the Invention

The present invention relates to mobile communication terminals, and in particular, to a mobile communication terminal with a multi-function key.

2. Description of the Related Art

A mobile communication terminal such as a mobile telephone has numeric keys for inputting (pressing) a phone number to be dialed and various data, and a plurality of function keys. The function keys include a SEND key for starting (i.e., making or answering) a call, a END key for ending the call, a MENU key for setting various functions, a STO (store) key for storing the phone numbers and various setting values, a RCL (recall) key for reading a stored phone number and displaying the read phone number on a display, and a CLR (clear) key. Moreover, the mobile communication terminal may have a voice mail key and other function keys according to its use and features. In such a case, too many keys are disposed on the limited front panel of the mobile communication terminal.

In general, a subscriber (or user) of the mobile telephone stores, in advance, frequently called phone numbers in a memory of the mobile telephone and then reads, when necessary, the stored phone numbers to display them on the display. To this end, the user should first input (or press) the STO key to store a phone number and then input the RCL key to read the stored phone number and display the read phone number on the display. That is to say, the user should use the two separate function keys of the STO key and the RCL key. When the mobile telephone has so many function keys, the user may have trouble in memorizing and utilizing the unique functions of the respective function keys. Further, it is difficult to reduce the mobile telephone in size.

SUMMARY OF THE INVENTION

It is therefore an object of the present invention to provide a mobile communication terminal with a multi-function key which serves as both a store key and a recall key.

To achieve the above object, a mobile communication terminal comprises a multi-function key; a memory for storing, in a function allocation table, input conditions of the multi-function key and corresponding functions for the respective input conditions; and a controller for determining a function of the multi-function key based on the function allocation table, when the multi-function key is pressed according to a given input condition.

Further, the mobile communication terminal includes a memory for storing messages for informing a user about the determined function, and a display for displaying a message for informing the user of the determined function.

The controller includes a flag, and sets the flag according to the function determined for the multi-function key.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

A preferred embodiment of the present invention will be described hereinbelow with reference to the accompanying drawings. In the following description, well known functions or constructions are not described in detail since they would obscure the invention in unnecessary detail.

Figure 1:
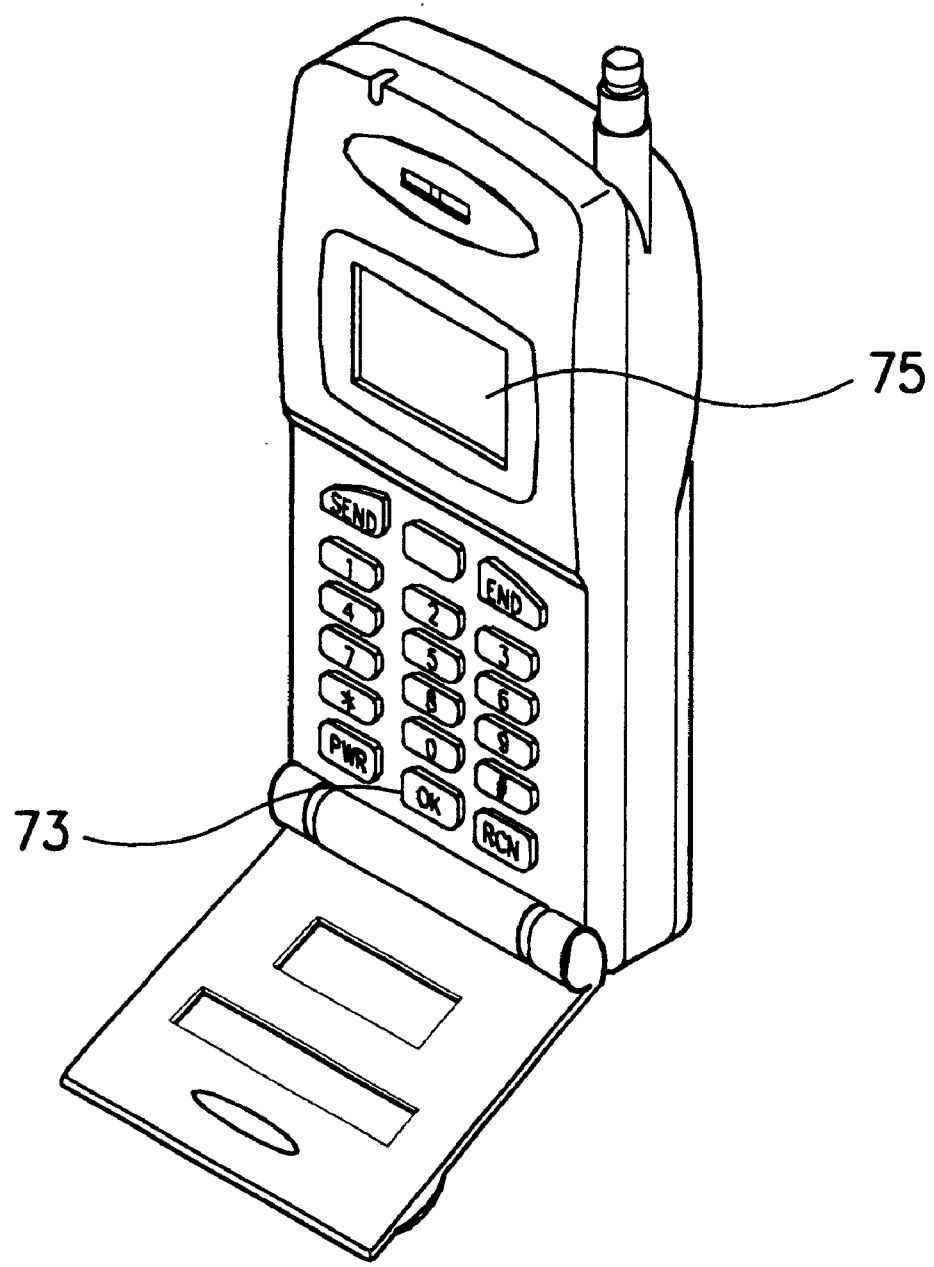
FIG. 1 is a perspective view of a mobile telephone with a multi-function key according to an embodiment of the present invention.

FIG. 1 illustrates a mobile telephone with a multi-function key according to an embodiment of the present invention. In an exemplary embodiment, an OK key 73 which is a multi-function key serves as both a STO key and a RCL key.

The function of the OK key 73 is changed according to an input condition, as described in the following Table 1, which is stored in a memory of the mobile telephone.

TABLE 1

| Input Condition | Function | Message |
| --- | --- | --- |
| Press OK key in Idle State | Read and Display Phone Number | "Recall:OK" |
| Press OK key after Numeric Key | Store Phone Number | "Store:OK" |

Figure 2:
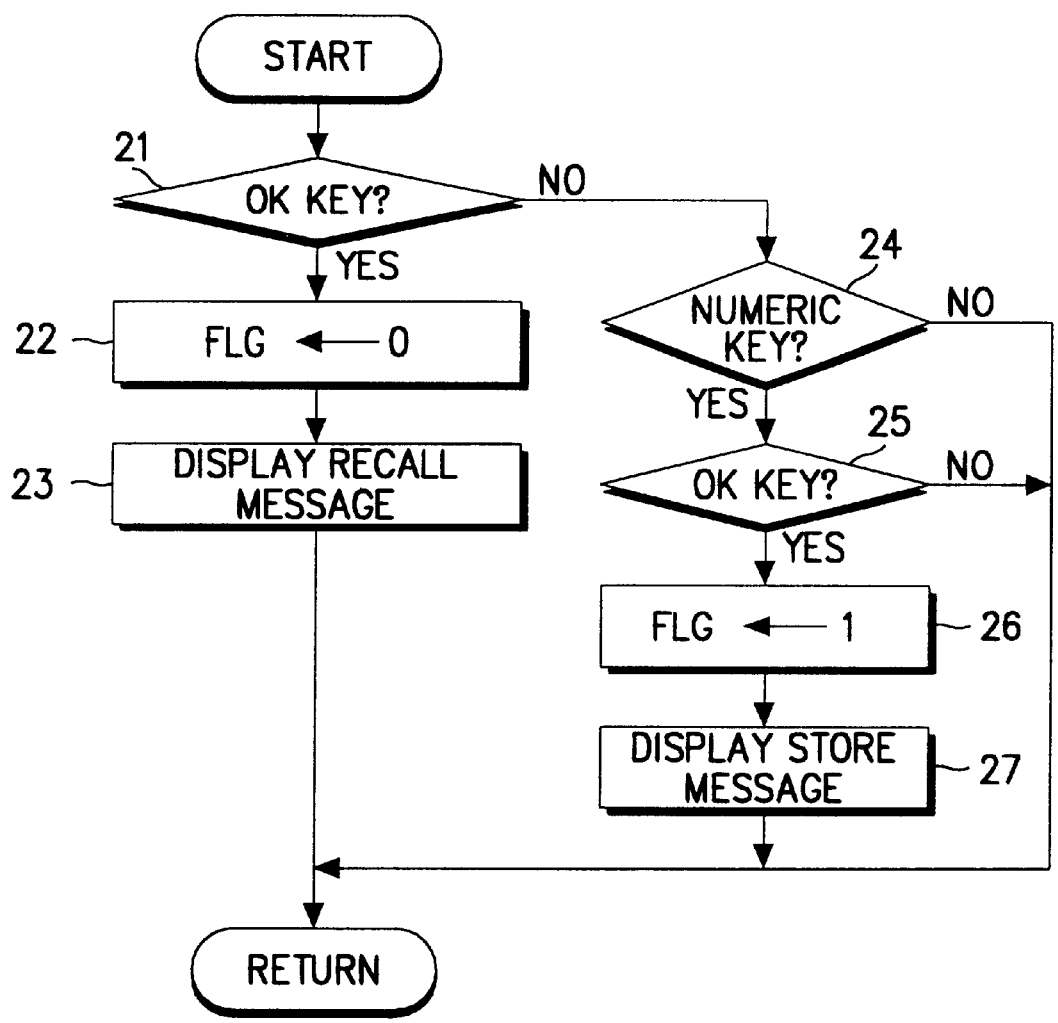
FIG. 2 is a flowchart illustrating the method for controlling a multi-function key of the mobile telephone according to an embodiment of the present invention.

FIG. 2 is a flowchart illustrating a method for controlling the multi-function key (i.e., OK key 73) according to an embodiment of the present invention.

Referring to FIG. 2, when the user presses the OK key 73 of the mobile telephone when the telephone is in an idle state, a controller (not shown) of the mobile telephone senses the press of the OK key 73 in step 21 and regards, based on Table 1, the OK key 73 as the RCL key for reading a phone number stored in a memory (not shown) and displaying the read phone number on a display 75. The controller then sets a flag FLG to 0 in step 22 so as to allow the OK key 73 to serve as the RCL key. After setting the flag FLG, the controller displays a message "Recall:OK" on the display 75 in step 23, to inform the user that the OK key 73 functions as the RCL key. Henceforth, if the user presses the OK key 73, the controller checks the status of the flag FLG and performs the recall function.

Alternatively, when the user presses a numeric key in the idle state and subsequently presses the OK key 73, the controller senses the pressing of the numeric key in step 24 and the pressing of the OK key 73 in step 25. Then, the controller regards the OK key 73 as the STO key, based on Table 1. Thereafter, the controller sets the flag FLG to 1 in step 26 and displays a message "Store:OK" on the display 75 in step 27, to inform the user that the OK key 73 functions as the STO key.

According to FIG. 2, when the OK key 73 is inputted after input of the numeric key (steps 24 and 25) and the flag FLG is set (Step 26), then a function of the OK key 73 is determined as "STORE". The user can recognize that the function of the OK key is determined as "STORE" by the display of such determination in the display 75 (Step 27). On the other hand, if the OK key 73 is immediately inputted in the idle state and the flag FLG is not set (Steps 21 and 22), the function of the OK key 73 is determined as "RECALL" (Step 23). In conclusion, if the flag FLG is set, so that the OK key 73 is determined as "STORE", the multi-function key such as OK key 73 determined as "STORE" is continuously used as a set function of the multi-function key, i.e. "STORE", until before the set of the flag FLG is released.

As described above, the multi-function key according to the present invention serves as both the RCL key and the STO key, thereby contributing to miniaturization of the mobile communication terminal.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A mobile communication terminal comprising:

a multi-function key;

a memory for storing, in a function allocation table, input conditions of the multi-function key that each correspond to a key input order; and a controller for determining a function of the multi-function key based on the key input order selected by a user for performing one input condition among several input conditions stored in the function allocation table, when the multi-function key is pressed, wherein said controller includes a flag for setting said determined function of the multi-function key until an other function of the multi-function key is determined.

2. The mobile communication terminal as claimed in claim 1, further comprising:

a memory for storing messages for informing the user about the determined function; and a display for displaying a message for informing the user of the determined function.

3. The mobile communication terminal as claimed in claim 1, wherein the key input order comprises an alphanumeric key input and the multifunction key input.

4. A mobile telephone comprising:

a multi-function key;

a memory for storing, in a function allocation table, first and second input conditions of the multi-function key, and storing store and recall functions corresponding to the first and second input conditions that each correspond to a key input order; and a controller for determining a function of the multi-function key to be a store or recall function based on the key input order of a user to perform the first and second input conditions stored in the function allocation table, when the multi-function key is pressed, wherein said controller includes a flag for setting said determined function of the multi-function key until an other function of the multi-function key is determined.

5. The mobile telephone as claimed in claim 4, further comprising:

a memory for storing messages for informing the user about the determined function; and a display for displaying a message for informing the user of the determined function.

6. A mobile communication terminal comprising:

a multi-function key for performing a telephone number storing function or a telephone number recall function;

a memory for storing, in a function allocation table, input conditions of the multi-function key corresponding to a key input order if only said multi-function key is pressed when said terminal is in an idle state or if said multi-function key is pressed after a telephone number is input by a user; and a controller for setting a function of the multi-function key based on the key input order and said function allocation table, wherein said telephone number recall function is set if only said multi-function key is pressed in said idle state and said telephone number storing function is set if said multi-function key is pressed after said telephone number is input.

* * * * *